A. Pevey,
Casting Gas Retorts.
Nº 18,926.
Patented Dec. 22, 1857.

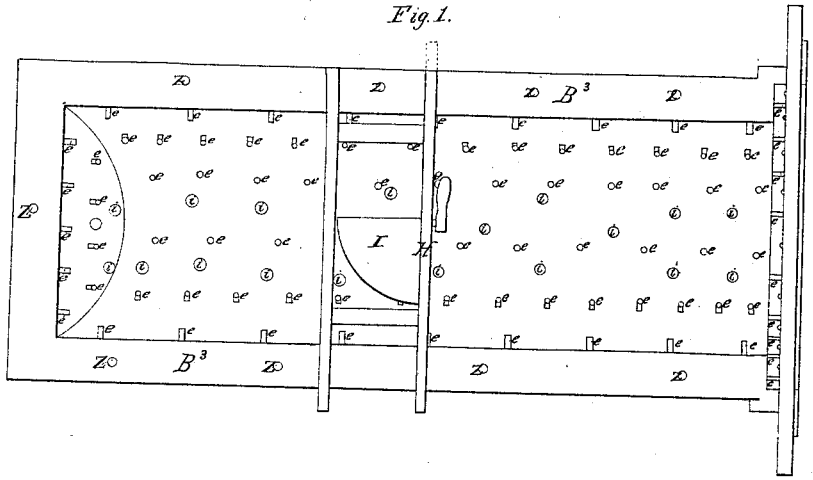
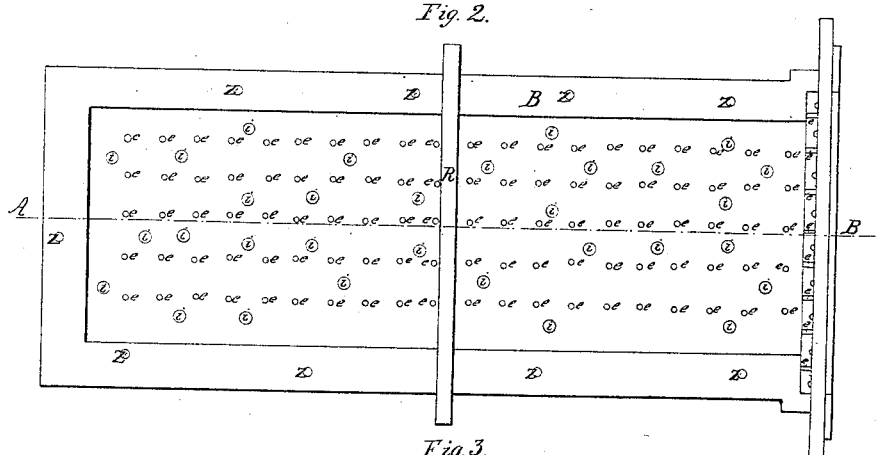
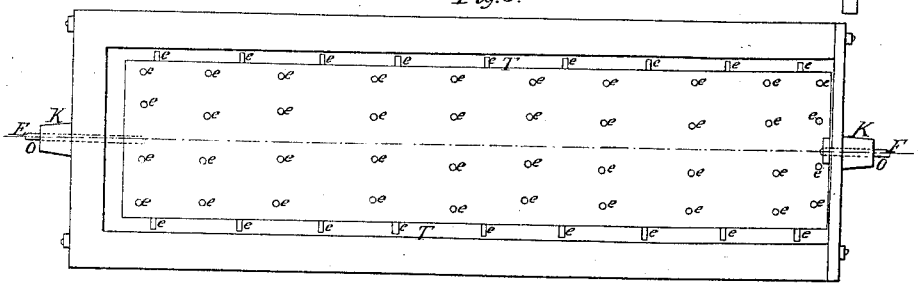

A. Pevey.

Casting Gas Retorts.

Nº 18,926.  Patented Dec. 22, 1857.

A. Pevey,
Casting Gas Retorts.
N° 18,926.   Patented Dec. 22, 1857.

UNITED STATES PATENT OFFICE.

ABIEL PEVEY, OF LOWELL, MASSACHUSETTS.

IMPROVEMENT IN CASTING GAS-RETORTS.

Specification forming part of Letters Patent No. 18,926, dated December 22, 1857.

*To all whom it may concern:*

Be it known that I, ABIEL PEVEY, of Lowell, in the county of Middlesex and Commonwealth of Massachusetts, have invented a novel and useful Improved Method of Making Gas-Retorts; and I hereby declare that the following specification, in connection with the accompanying drawings and references thereon, constitute a lucid, clear, and exact description of the construction and method of using my invention.

Figure 4:
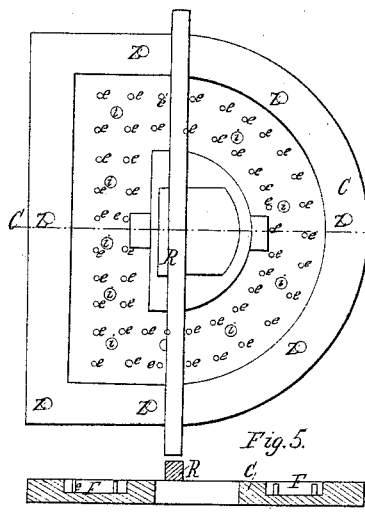
Figure 18:
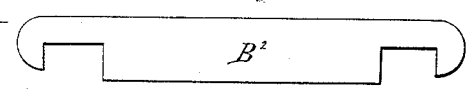
Figure 9:
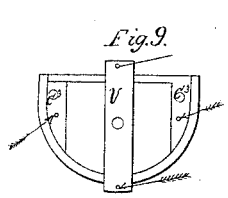
Figure 16:
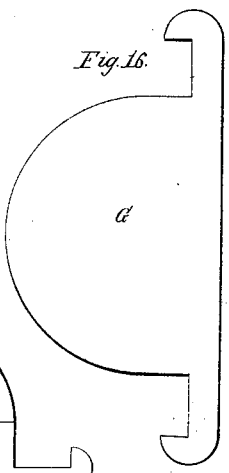
Figure 17:
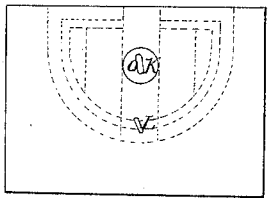
Figure 6:
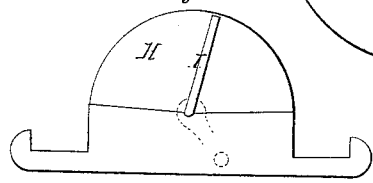
Figure 3:
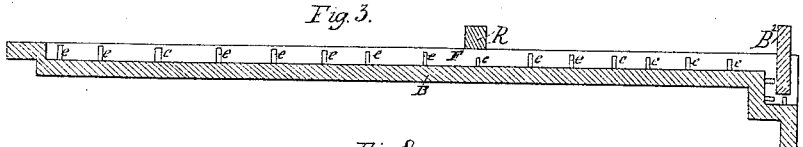
Figure 8:
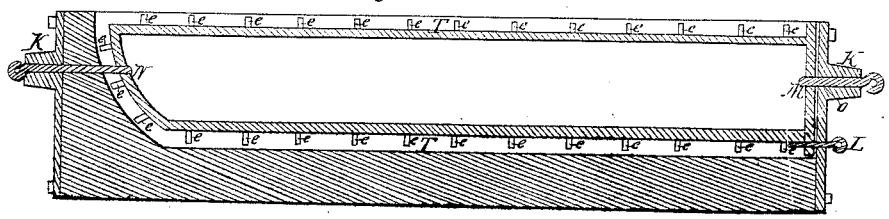
Figure 11:
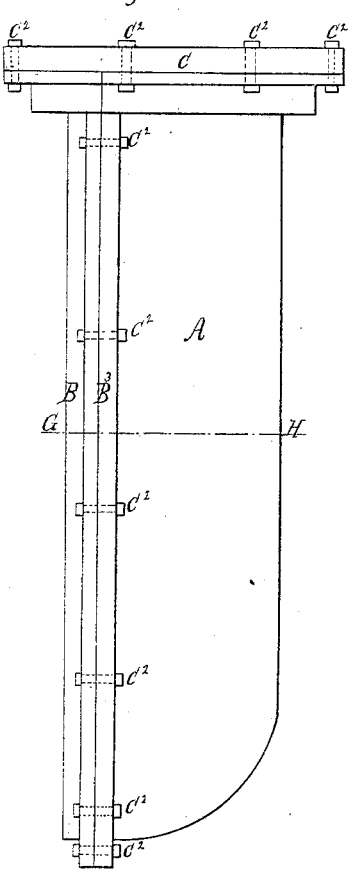
Figure 12:
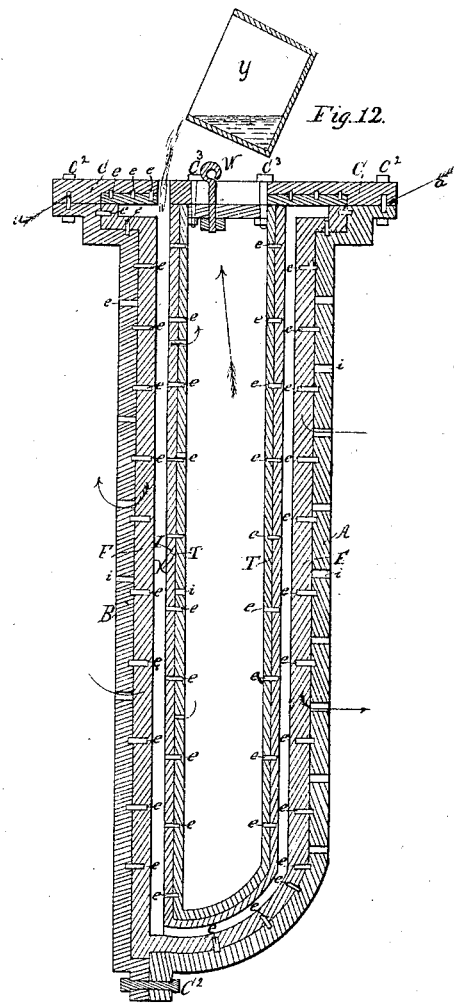
Figure 10:
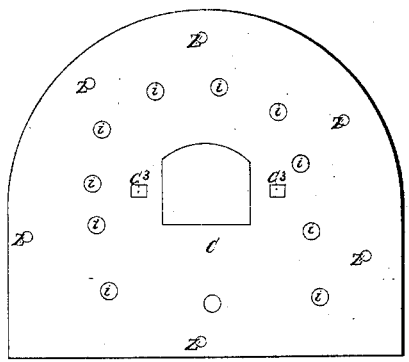
Figure 13:
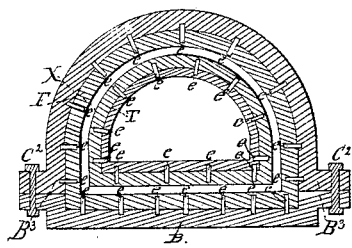
Figure 15:
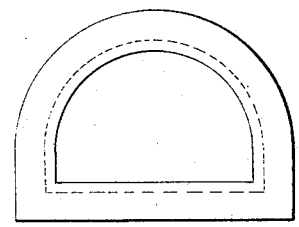
Figure 14:
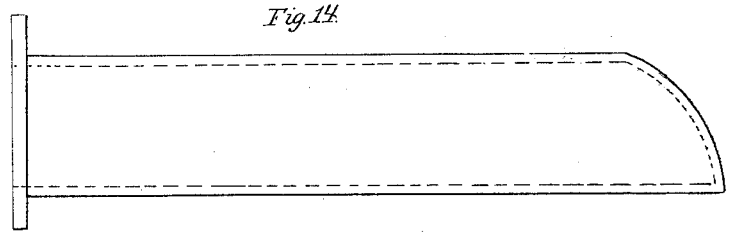

In referring to the said drawings, Figure 1 denotes a top view of the flask or main part of it laid horizontal and open ready for the curved or outside mold or form of the retort to be struck therein. Fig. 2 is an inverted view of the flask-cover ready for the flat or level portion of the retort to be formed or struck thereon. Fig. 3 is a horizontal section on line A B, Fig. 2, showing the manner in which the loam is held to the different parts of the flask by the pins or snags. Fig. 4 is an inner plan of the flask cap or end ready for the loam to be formed thereon. Fig. 5 is a section of the same on line C D. Fig. 6 is an elevation of the striker for forming the loam in the flask. Fig. 7 denotes a plan or top view of the core-box having the core-rod therein ready for the core to be formed around it, the outside shape of the core being formed by the inside of the core-box. Fig. 8 is a longitudinal section on line E F of Fig. 7. Fig. 9 is an end view of the core-rod, showing how it is bolted or connected to the cap or top end of the flask. Fig. 10 is an outside end or top view of the cap to the flask. Fig. 11 is a vertical elevation of the flask with the core and rod therein ready for pouring or casting the retort. Fig. 12 is a central and vertical section of Fig. 11. Fig. 13 is a transverse section on line G H of Fig. 11. Fig. 14 is a side elevation of the retort after being cast by my method. Fig. 15 denotes an end view of the same. Fig. 16 is a plan of the striker for forming the oval part of the flange of the retort. Fig. 17 is an end view of the core-box, showing the mandrels and steady pin for keeping the core-rod steady or in its place in the core-box when the core is being formed therein. Fig. 18, $B^2$, is an elevation of the striker for forming the mold for the flange of that part of the retort in the cover or the straight part of the flange.

The nature of my invention consists in constructing, arranging, and operating my flask, as hereinafter described, which allow of using the heat generated and contained in the flask by pouring or casting of one retort to set or dry the loam used to form the next mold, so as to give it the desired form, thereby enabling the molders to cast two retorts a day, whereas only one could be cast in the same time by a single flask by any of the old methods heretofore adopted, and in constructing self centralizing and suspending the core, as within described, so that it may be perfectly true with the inside of the flask, and consequently leave every part of the retort of an equal or desired thickness.

To enable others skilled in the art to which my invention appertains to construct and carry out the same, I will describe it as follows, after simply stating that several methods different from mine have heretofore been adopted in casting gas-retorts, in which the pouring has been done when the flasks were both vertical and horizontal, and that patterns have been used in all cases and molded with green or wet sand; that no retorts have heretofore been cast in a loam-mold, and no gas-retorts of the usual size have heretofore been cast at a rate faster than one retort to one flask in one day, and the cores have been sustained by "chaplets," which render the retorts very defective by the liability of that portion of the chaplets left in the casting to get loose when the retort is heated for use.

I construct the main part of my flask of cast-iron, as seen at A, Figs. 1, 11, 12, and 13; and I also construct a recessed cover of cast-iron, (seen at B, and at Figs. 2, 3, 11, and 12,) which I secure to the part A by means of bolts. (Seen at $C^2$, Figs. 11 and 12.) I then construct a cast-iron recessed cap, (seen at C and Figs. 4, 5, 11, and 12,) and which is designed to be connected to the top of the flask by bolts $C^2$ after the flask is raised to the vertical position seen in Figs. 11 and 12. The guides $B^3$, on which the striker H is operated to form the outside shape of the retort true and correct, may be formed of the joint edges of the main portion A of the flask; or these guides $B^3$ may be first made and then bolted to the flask A exactly true, or at right angles with the open end of it, or they may be made of other form and otherwise secured than those shown in the main part A of the flask, as seen at B³, if desired.

The whole inside of the main part A of the flask, its cover B, and cap C, is provided with pins or snags, (seen at $e$, Figs. 1, 2, 3, 4, 5, 6, 7, 8, 9, 12, and 13,) which project inward for receiving and holding the loam or other substance. (Seen at F, Figs. 3, 5, 12, and 13.) I then form an iron striker, (seen at G, Fig. 1, and at Fig. 16,) and place it into the large or flange end of the flask. Then the loam or other substance, (seen at F,) previously mixed to the proper consistency, is shoveled into this flange portion of the flask, and the striker G moved back and forth therein until the heat in the flask caused by the previous casting sufficiently dries and hardens the loam in this part of the flask to remain in the shape formed by the striker G. Then the striker (seen at H, Fig. 1 and at Fig. 6) is placed in the flask, as seen at Fig. 1, and the loam then shoveled into this part of the flask, and this striker H is then moved back and forth therein, and occasionally stopped at the end of the flask in which the solid or butt end of the retort is cast, when the secondary striker I, Figs. 1 and 6, can be swung up first one way, then the other, to form the outer shape of the retort in this portion of the flask, the heat in the flask drying and hardening the loam as it is being formed by these strikers. When sufficiently hard to remain in shape, the strikers are all taken from the main part A of the flask, when it is ready for troweling and blacking, ready for being placed in an oven to be intensely heated or baked ready for use. The loam, being properly prepared, is shoveled onto the recessed cover in sufficient quantities, when a straight striker, R, Figs. 2, 3, 4, and 5, is used to strike off all the loam which may project above the recesses or edges or joints of this cover. The pins or snags $e$ in it effectually hold the loam in its place for use, and the heat contained in this cover from pouring or casting the previous retort assists to dry or harden the mold. The loam is also placed or shoveled onto the recessed cap C, and then the straight striker R is made to remove all the loam above the thick portion or recess of this cap, as seen at Figs. 4 and 5, similar to the cover B.

It is of the greatest importance in making gas-retorts to use the heat in the flask caused by casting a previous retort in forming the loam in the next mold, and this is effectually done by my invention, as I have fully tested it by actual experiment by using what is termed "loam," instead of molding-sand, and in taking the flask apart as soon as the retort is poured, and then brushing out the loam deranged or damaged by the previous casting, if any, and then proceeding instantly to re-form the mold by a fresh quantity of loam in manner just stated.

I construct a core-box of wood and a core-rod of iron, (seen at Figs. 7 and 8,) the inside of the box being shaped similar to the desired shape of the inside of the retort; but the core-rod should be as much smaller as the thickness of the sand (seen at T, Figs. 7, 8, 12, and 13,) of which the core is made. This rod is provided with a number of pins or snags, (seen at $e$,) which project outward to receive and hold the sand. The core-box is formed in the inside the same shape as the core should be on the outside, to impart the proper shape to the core.

To each end of the core-box is attached firmly a trunnion, (seen at K, Figs. 7 and 8,) for the purpose of hitching chain-hooks to it to swing and operate it by a derrick, as it and also the flask is very heavy and has to be so handled through the trunnions seen at K, Figs. 7 and 8. On each end of the core-box are formed holes, through which I pass mandrels O into these holes at each end of the core-rod, which firmly hold this rod in the desired position in the core-box while the sand is being rammed around it. This rod is kept from swinging or turning when the core is being made by the steady-pin L, Figs. 8 and 17, which passes through one end of the core-box and into the rod, which will be readily seen. The core is formed of green or wet sand, T, rammed into the box around the rod and up even with the top of the box. Then an iron plate (not shown) is placed on the core-box, which is then raised by a derrick or other convenient and efficient means connected to the trunnions K and turned over upon a carriage, by which it may be moved to an oven for "baking," to be ready for use.

The finishing of my flask must be done in the best manner. First, the joint on the main part of the flask A on which the cover B is bolted should be nicely planed, and a number of holes, Z, should be formed through both these parts to admit bolts (seen at C²) to firmly hold this cover B to the main part A and the open end of the flask, and the cap C must be planed off in an exact right angle with the main part A and cover B, to receive the cap C, which has been also planed level and true in an iron planer. And the cap C is likewise held to both the main part A and cover B by bolts C². (Seen at Fig. 11.) The end of the core-rod seen at Fig. 9 must be squared off in an engine-lathe by a mandrel passed through the holes M and N the extreme length of the rod, so that it will fit exactly true and square to the cap C, in order that the core may be suspended true and held to the cap C by bolts C³ in the mold or flask, and consequently every part of the retort will be of an exact equal thickness without the aid of any chaplets whatever to sustain the core, thus rendering viewing of the interior of the flask unnecessary after the core is set, as in some cases in the old method by removing the bottom of the flask.

It will be seen that the core is self-centralized and placed in the flask by simply lowering it into the flask. The greatest firmness must be had in the main part A, cap C, and core-rod, in order to suspend the core by one end in the flask, and with sufficient firmness to resist the shock of the molten iron as it is poured into the flask for forming the retort, and to hold it in the proper place, even if the flask should not be erected exactly perpendicular for pouring the retort, on account of the great weight of the core. A hole (seen at M) is formed through the cross-bar V in the end of the core-rod, (seen at Fig. 9,) for the purpose of putting in an eyebolt for hooking on the chain to draw the core-rod out of the retort after it is cast, and also for raising the core and cap C up and lowering it down into the flask, as will be readily understood. This hole M is also used in conjunction with the hole N to receive the mandrels O for forming the core. A number of holes, $i$, are formed through the parts A, B, and C of the flask, and also through the core-rod, to allow the gas to escape, as the arrows in Fig. 12 point, through the holes in the flask, and in through the holes $i$, formed through the core-rod to the center or open space of the core-rod, then out at the opening in the top or end of the core, as the arrow points, as seen in Fig. 12.

The loam being formed in the main part A, cover B, and cap C of the flask, as hereinbefore stated, then the cover B is bolted to the part A, (seen at Fig. 11,) and properly baked in and removed from the oven, and erected perpendicularly, as seen at Fig. 11. The core-rod carrying the core is firmly bolted to the cap C, and is then raised by the eyebolt W (Fig. 12) and derrick to which it may be hitched, and let carefully down into the flask, which centralizes and sets it by such letting down. Then the cap C can be bolted to both the main part A and cover B, as seen at Fig. 11, the steady-pins $a$ answering to guide and keep in place the cap and core when being lowered to its place (seen at Fig. 12) ready for pouring the molten iron into the flask to form the retort. It will be seen that in the interior of every part of the flask, when put together, that the vacancy or space X to receive the iron is of an exact equal thickness in every part of the mold or flask. A surface of loam is presented to the molten iron when poured into the mold, and the molten iron is effectually prevented from coming in contact with any part of the cold iron either of the flask or core-rod. The flask being ready, the molten iron is poured into it from any ordinary ladle of sufficient capacity (seen at Y) and allowed to "set," then the flask may be taken apart, and the retort thus cast is allowed to drop from it when the flask is hot, and ready to be reloamed, if necessary, for casting another retort, and so on. The flask prepared in this manner frequently answers to cast several retorts in with little done to the loam, in consequence of its being baked and formed so hard with the mold in the manner before stated, a new core being necessary of course for casting each retort. The inner surface of the cap being planed true, and the loam being formed therein equally true, the front or open end of the retort will of course be square and even, and in good condition to receive the "bonnet" used on the ends of the retorts in gas-works.

The retorts themselves, when made by my method substantially as within described, are every way a superior article. The whole interior and exterior surface is true, even, and smooth, and of an equal thickness in every part. The front or open end is true and even and square with the body of the retort, and they are much more likely to be perfectly sound than when made in the old way by sustaining the cores on chaplets and molding the retort with a whole or sectional pattern.

I disclaim the general principle of the formation of a mold without patterns by sweeping, or without flasks, as such is well known, and forms no part of my claim. Neither do I claim hanging cores in the cope, or setting them for casting kettles in the ordinary manner, as that also forms no part whatever of my invention or claim.

What I claim as my invention, and desire to secure by Letters Patent, is—

My within-described flask composed of the several parts A B C and former H and I, constructed and relatively arranged and operated for molding the retort, and for self centralizing and setting the core, essentially in the manner as fully set forth and described.

ABIEL PEVEY.

Witnesses:
E. W. SCOTT,
HENRY I. SNELL.